United States Patent
Goedgebuer et al.

(10) Patent No.: US 6,704,420 B1
(45) Date of Patent: Mar. 9, 2004

(54) DEVICE FOR SENDING OR RECEIVING A SIGNAL ENCRYPTED USING DETERMINISTIC CHAOS

(75) Inventors: Jean-Pierre Goedgebuer, Pouilley les Vignes (FR); Laurent Langer, Besançon (FR); Jean-Marc Merolla, Nommay (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/323,742

(22) Filed: Jun. 1, 1999

(30) Foreign Application Priority Data

Jun. 2, 1998 (FR) .............................. 98 06892

(51) Int. Cl.$^7$ .............................. H04L 9/00; H04K 1/00
(52) U.S. Cl. ...................................... 380/263; 380/256
(58) Field of Search ........................................ 380/263

(56) References Cited

U.S. PATENT DOCUMENTS

| | | | |
|---|---|---|---|
| 4,799,797 A | * 1/1989 | Huggins ..................... 356/345 |
| 5,048,086 A | * 9/1991 | Bianco et al. ................. 380/28 |
| 5,125,737 A | * 6/1992 | Rodriguez et al. ............ 365/39 |
| 5,253,309 A | * 10/1993 | Nazarathy et al. ............. 385/4 |
| 5,289,550 A | * 2/1994 | Plastow ........................ 385/9 |
| 5,547,274 A | * 8/1996 | Plastow ....................... 385/15 |
| 5,557,442 A | * 9/1996 | Huber ......................... 359/179 |
| 5,999,293 A | * 12/1999 | Manning ..................... 359/139 |
| 6,018,582 A | * 1/2000 | Francios et al. ............. 380/256 |
| 6,028,885 A | * 2/2000 | Minarik et al. ............. 375/135 |
| 6,049,614 A | * 4/2000 | Kim ........................... 380/263 |
| 6,239,893 B1 | * 5/2001 | Bigo et al. .................. 359/176 |

FOREIGN PATENT DOCUMENTS

FR   2743459   7/1997

OTHER PUBLICATIONS

Fiellemans A.: "Basic Science" IEEE Spectrum vol. 35, No. 1, 1/98 pp. 100–103.

Annovazzi–Lodi V.et al.: "Synchronization of Chaotic Lasers By Optical Feedback For Cryptographic Applications" IEEE Journal Of Quantum Electronics, vol. 33, No. 9 9/97 pp. 1449–1454.

Celka P: "Chaotic Synchronization and Modulation of Nonlinear Time–Delayed Feedback Optical Systems" IEEE Transactions on Circuits and Systems I: Fundamental Theory and Applications, vol. 42, No. 8, Aug. 1, 1995 pp. 455–463.

"Chaos Based Lasers May Yield Secure Communications" Machine Design vol. 67, No. 13, Jul. 27, 1995 p. 20.

* cited by examiner

Primary Examiner—Gilberto Barrón
Assistant Examiner—Kambiz Zand
(74) Attorney, Agent, or Firm—Blakely, Sokoloff, Taylor & Zafman

(57) ABSTRACT

Device for sending an encrypted signal, including:
  a source (1) for generating said signal and means (2) for intensity modulating the signal,
  a feedback loop which includes delay line means and non-linear means,
characterized in that the feedback loop includes:
  an interferometer (5) to which is applied an electric current that corresponds to the delayed generated signal and an auxiliary source of constant intensity that feeds the interferometer optically, the output signal of the interferometer being a non-linear function of the output signal of the delay line means,
  a photodiode (7) which converts the luminous power at the output of the interferometer to a modulation current, and
  a summing circuit (8) which adds the message to be encrypted to the modulation current at the output of said photodiode, the output signal of the summing circuit controlling modulator means.

10 Claims, 3 Drawing Sheets

US 6,704,420 B1

DEVICE FOR SENDING OR RECEIVING A SIGNAL ENCRYPTED USING DETERMINISTIC CHAOS

The present invention concerns transmissions using encryption by deterministic chaos.

The invention finds one advantageous application in the confidential transmission of information in optical networks.

It also finds an application in the microwave field for encrypting radio communications.

In encryption using chaos, the message is concealed in a chaotic signal, that is to say a signal that fluctuates in a random but deterministic manner. The sender of the message has a chaos generator that is used to conceal the message in clear in a chaotic signal. The receiver has another chaos generator which must be synchronized to the first one to be able to decrypt the message correctly.

The chaos generators of most interest for use in encryption are devices known as "non-linear systems with delay". They comprise a light source which has a feedback loop formed of a non-linear element and a delay line.

They have the advantage of being simple whilst producing chaos with very large dimensions, that is to say very complex chaos, which enables a very high level of confidentiality to be obtained.

The problem that arises with this type of chaos generator is that the sender and the receiver must be synchronized so that the message can be decrypted in real time. Very few implementations in the optical domain have been described before now.

Patent FR 2 743 459 describes an encryption system using as the sender a chaos generator formed of a wavelength tuneable source and a non-linear wavelength component. The device encrypts a message in the form of chaotic modulation of the wavelength emitted by the light source. The document reports that encryption and decryption are effected by the sender and the receiver using non-linear wavelength elements which must be identical in the sender and in the receiver.

This process has the advantage of being simple to implement but it is difficult to use over long distances (i.e. in systems employing optical fibres) because the same wavelength non-linearities must be conserved between the sender and the receiver over the whole distance.

This condition is not satisfied when the transmission channel is a standard optical fibre. The fibre introduces chromatic dispersion effects which affect the wavelengths transmitted between the sender and the receiver, which makes it difficult to obtain conditions enabling the receiver to decrypt the message.

The solution to the problem of producing chaos that is usable over long distances and of avoiding dispersion problems is to use a chaos generator producing chaotic modulation of the luminous intensity from a monochromatic source. Existing devices, referred to hereinafter as "intensity chaos generators", cannot be used in the encryption and decryption process described in the previously mentioned patent FR 2 743 459, however, for reasons that will now be explained.

FIG. 1 shows an intensity chaos generator the effect of which is to produce chaotic modulation of the luminous intensity from the monochromatic source 1, as described by P. Celka in an article entitled "Chaotic synchronization and modulation of nonlinear time-delayed feedback optical systems", IEEE Transactions on Circuits and Systems, 42, 8, pp 455–463, 1995. The source 1 is optically connected to an integrated Mach-Zehnder interferometer 2 whose output intensity P(t) 3 is converted by the photodetector 4 into an electrical signal looped to the control electrodes of the interferometer after passing through a delay line T 5. The reader is also referred to the following documents in which the non-linear energy element is an electro-optical crystal, an acousto-optic crystal or a Michelson or Fabry-Pérot interferometer:

F. A. Hopf, D. L. Kaplan, H. M. Gibbs, R. L. Shoemaker "Bifurcation to chaos in optical bistability", Phys. Rev. A, 25, 4 pp 2172–2182, 1982;

R. Vallée, C. Delisle "Route to chaos in an acousto-optic bistable device", Phys. Rev. A, 31, 4 pp 2390–2396, 1985;

Y. Liu, J. Ohtsubo "Chaos in an active interferometer", J. Opt. Soc. Am. B, 9, 2, pp 261–265, 1992;

T. Takizawa, T. Liu, J. Ohtsubo, "Chaos in a feedback Fabry-Pérot interferometer", IEEE J. of Quantum Electronics, 30, 2, pp 334–338, 1994.

In all the above systems the non-linear element induces energy non-linearity directly in the light issuing from the source and the chaotic luminous signal obtained in this way is looped, after optical-electrical conversion, via a feedback loop with delay to the source or to the electrodes of the non-linear element. The law of evolution of the intensity produced by all the above systems is different from that of the chaos on which the encryption process described in the previously mentioned patent is based, however, which means that it cannot be transposed to the above systems.

Thus in FIG. 1, the luminous intensity P(t) emitted by the emitter is governed by the following equations:

$$P(t) = P_0\left[1 + \cos\frac{2\pi}{\lambda}V(t-T)\right] \text{ and } V(t) + \tau\frac{d}{dt}V(t) = \eta P(t)$$

where V(t) is the electrical signal produced by the photodetector, η is its electrical gain, τ is the time constant of the feedback loop and λ is the wavelength of the source.

The above two equations can be combined in the form of a non-linear differential equation with delay which governs the law of evolution of the chaos intensity P(t) produced at the output 3 of the interferometer:

$$\frac{\lambda}{2\pi}\cos^{-1}\left[\frac{P(t)}{P_0}-1\right] + \tau\frac{d}{dt}\cos^{-1}\left[\frac{P(t)}{P_0}-1\right] = \eta P(t-T) \quad (1)$$

The chaos obtained and the equation (1) that governs it are different from the model described in the previously cited patent FR 2 477 459, in which the chaos must obey an equation of the type:

$$P(t) + \tau\frac{d}{dt}P(t) = \pi[A - \mu\sin^2\{MP(t-T)\}] \quad (2)$$

This makes it impossible to use the simple encryption method described therein.

A much more complex method that is already known per se can be used.

FIG. 2 shows this solution to the problem of decrypting the chaos governed by equation (1). It is based on the method of synchronizing chaos described by Pecora and Caroll in the document "Synchronization in chaotic systems" published in Physical Review Letters, vol. 64, pp 821–824 in 1990. The sender 6 is a chaos generator formed of two coupled sub-systems, a master chaos generator 7 and a slave chaos generator 8. The master generator generates chaos as shown to control the chaos from the slave generator. The message s(t) to be encrypted is encoded (generally in the form of a simple addition) on the slave chaos which behaves like interference noise. The combination is transmitted to the receiver 9. This includes a slave generator 10 (identical to the slave generator of the sender), controlled by the synchronization signal from the master generator of the sender. When the chaos from each generator has been synchronized, the message s(t) can be recovered by subtraction. Note that this method generally necessitates two transmission channels 11 and 12, one for the encrypted signal and the other for the synchronization signal.

One embodiment in the optical domain is described by P. Celka in the previously cited article "Chaotic synchronization and modulation of nonlinear time-delayed systems" published in IEEE Transactions on Circuits and Systems, vol. 42, number 8, pp 455–463 (August 1995). The device uses a monochromatic light source and a plurality of Mach-Zehnder interferometers controlled by feedback loops with delay to obtain synchronization between chaos generated by the sender and by the receiver.

FIG. 3 shows the encryption and decryption system proposed in the above article and provides a basis for some explanation of its operating principle. The sender 13 comprises two coupled chaos generators 14, 15 based on the principle shown in FIG. 1. The receiver 16 comprises two modules 17 and 18, each of which comprises two chaos generators 19, 20 and 21, 22 appropriately paired to assure synchronization. Each chaos generator consists of a Mach-Zehnder interferometer the optical output of which is looped electrically to the control electrodes by a feedback loop with delay, as in the embodiment shown in FIG. 1. The reader is referred to basic equations 1 to 4 and to FIGS. 1, 2, 6 and 12 of the article by P. Celka for a complete description of the system and its use for encryption of digital signals by Chaos Shift Keying (CSK).

The devices described above have drawbacks:

In the case of the device described in patent FR 2 743 459, the technical problem arises from the difficulty of complying strictly with the wavelength conditions between the sender and the receiver for large transmission distances using the optical fibres employed in telecommunications (because of their chromatic dispersion). To solve this problem it is necessary to use offset dispersion fibres, but this solution rules out the use of most existing networks.

Existing intensity chaos encryption systems are chaos generators with conditions of use that lead to very complex and costly systems. This complexity leads in particular to major technical difficulties in implementing systems having low time constants suited to high encryption speeds, compatible with the bit rates of several Gbit/s typical of fibre optic telecommunications. Also, in some cases, the Pecora and Caroll method necessitates an additional transmission channel for synchronization, which is a disadvantage in the telecommunication field.

The aim of the present invention is precisely to remedy these drawbacks.

The invention proposes a device for sending an encrypted signal, including a source for generating said signal and means for intensity modulating the signal, a feedback loop which includes delay line means and non-linear means, characterized in that the feedback loop includes an interferometer to which is applied an electric current that corresponds to the delayed generated signal and an auxiliary source of constant intensity that feeds the interferometer optically, the output signal of the interferometer being a non-linear function of the output signal of the delay line means, a photodiode which converts the luminous power at the output of the interferometer to a modulation current, and a summing circuit which adds the message to be encrypted to the modulation current at the output of said photodiode, the output signal of the summing circuit controlling modulator means.

The source for generating the signal is advantageously an optical source, said device including a photodiode which converts the generated signal into an electrical signal and means for injecting the electrical signal into the input of the delay line means.

However, the sender device proposed by the invention can equally be used to send encrypted radio frequency signals, the source for generating the signal then being a radio frequency source.

The invention also proposes a device for receiving an encrypted signal, including means for receiving said signal, a feedback loop which includes delay line means and non-linear means, characterized in that the feedback loop includes an interferometer to which is applied a current that corresponds to the delayed received signal and an auxiliary source of constant intensity which feeds the interferometer optically, the interferometer output signal being a non-linear function of the output signal of the delay line means, a photodiode which converts the luminous power at the interferometer output into a current, and a subtractor circuit which applies the subtraction operation to the received signal and to the output current of said photodiode, the output signal of the subtractor circuit being the demodulated signal.

When the encrypted signal is an optical signal, the receiver means comprise a photodiode that converts the luminous power from the transmission channel into an electrical signal.

When the encrypted signal is a radio frequency signal, the receiver means include a receive antenna.

In a sender or receiver device of the type proposed by the invention, the interferometer is advantageously of the Mach-Zehnder type.

The Mach-Zehnder interferometer is preferably integrated on lithium niobate, gallium arsenide or silicon.

Other features and advantages of the invention will become apparent in the following description which is purely illustrative and not limiting on the invention and which must be read in conjunction with the accompanying drawings, in which:

FIG. 1, already analysed, is a block diagram of a prior art intensity chaos generator;

FIG. 2, also already analysed, is a block diagram of a prior art system for encryption/decryption by synchronization of chaos;

The encryption/decryption technique proposed by the invention is for use in transmission systems employing intensity modulated optical sources, especially sources which have their sending power modulated internally, or sources modulated externally, for example by an electro-optical intensity modulator, or light-emitting diodes.

Figure 4:
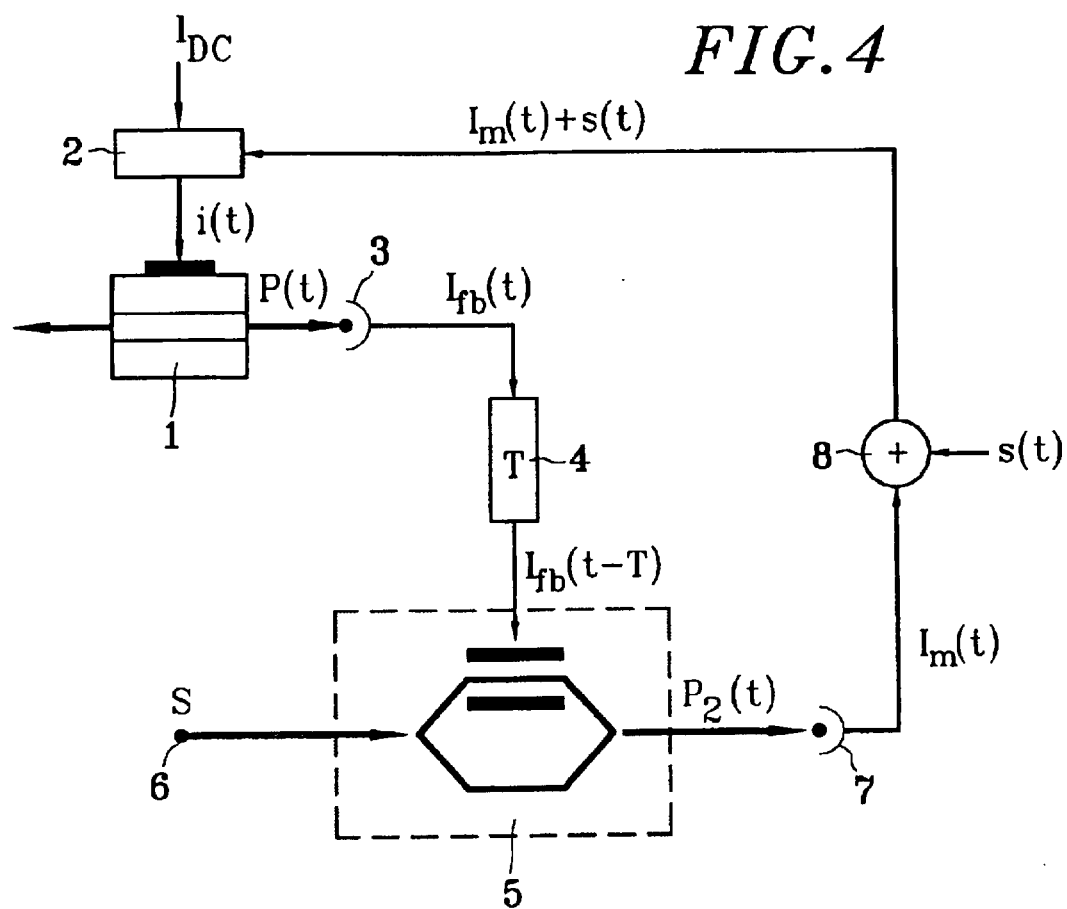
FIG. 4 is a block diagram of a sender device constituting one embodiment of the invention in the case of optical transmission.
Figure 5:
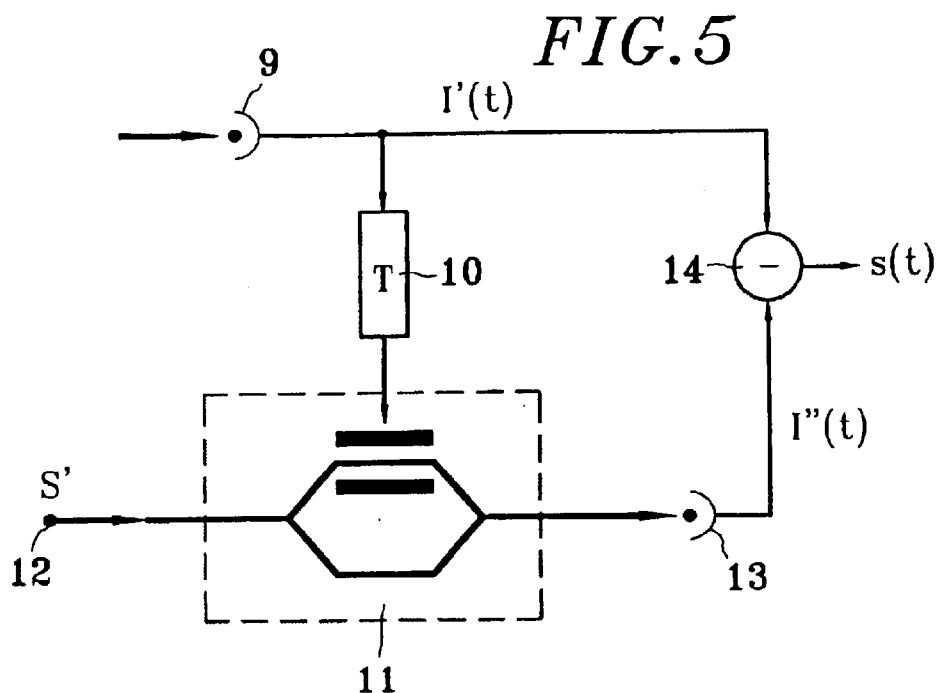
FIG. 5 is a block diagram of a receiver system constituting one embodiment of the invention in the case of optical transmission.

The cryptosystem shown in FIGS. 4 and 5 includes a sender which encrypts the message s(t), a transmission channel consisting of a standard optical fibre and a receiver which performs the decrypting.

a) The sender (FIG. 4) comprises:

a laser diode 1 emitting a light beam the power of which can be modulated internally or externally, modulator means 2 for modulating the energy $P_0$ emitted by the laser diode in proportion to the electrical control signal i(t): the emitted luminous power is written P(t)=Ki(t), K being fixed by the modulation parameters; the modulator means can equally comprise an external modulator at the output of the laser diode 1, a feedback loop formed of:

a first photodiode 3 which converts P(t) into an electrical signal $I_{fb}(t)$, with a conversion factor $\eta_1$ a delay line 4 which delays $I_{fb}(t)$ by a time T an interferometer 5, for example a Mach-Zehnder interferometer integrated on lithium niobate, having electrodes to which the delayed signal $I_{fb}(t-T)$ is applied an auxiliary source S 6 of constant intensity $P_1$ (which can be a laser diode or a light-emitting diode) which feeds the interferometer optically; after passing through the interferometer, the output power $P_2$ is a non-linear function NL of the control signal $I_{fb}(t-T)$:

$$P_2(t) = P_1 NL[I_{fb}(t-T)]$$

a second photodiode 7 which converts the luminous power $P_2(t)$ transmitted by the interferometer into a modulation current $I_m(t)$ with a conversion factor $\eta_2$; the equation relating the current $I_m(t)$ to the optical power P(t) is written:

$$I_m(t) + \tau \frac{d}{dt} I_m(t) = \eta_2 P_1 NL[\eta_1 P(t-T)]$$

in which τ represents the time constant of the feedback loop.

a summing circuit 8 which adds the message s(t) to be encrypted to the modulation signal $I_m(t)$ The composite signal i(t)=$I_m(t)$+s(t) constitutes the control signal of the modulator circuit 2; finally, the luminous intensity P(t) of the laser diode is governed by a non-linear differential equation with delay of the form:

$$P(t) + \tau \frac{d}{dt} P(t) = \eta_2 P_1 NL[\eta_1 KP(t-T)] + s(t) + \tau \frac{d}{dt} s(t) \quad (3)$$

The above expression is a non-linear differential equation with delay whose solutions are known to be chaotic solutions under certain conditions.

The message s(t) is encrypted within the chaotic fluctuations of the luminous intensity of the source.

Figure 1:
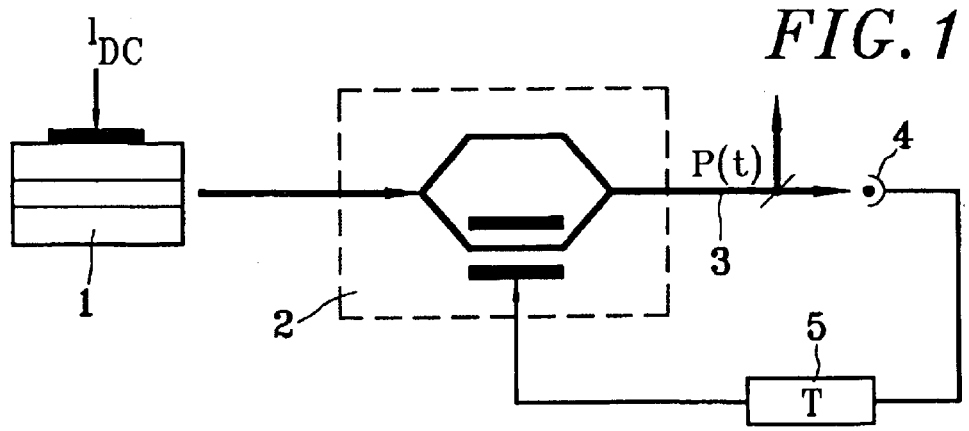
Figure 2:
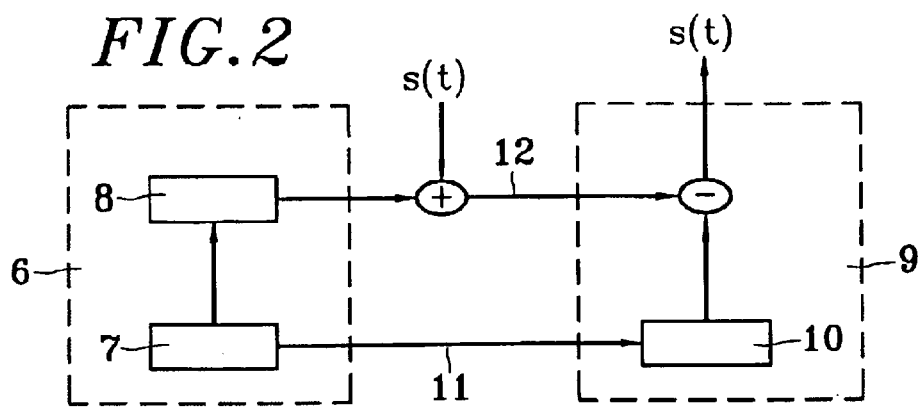
Figure 3:
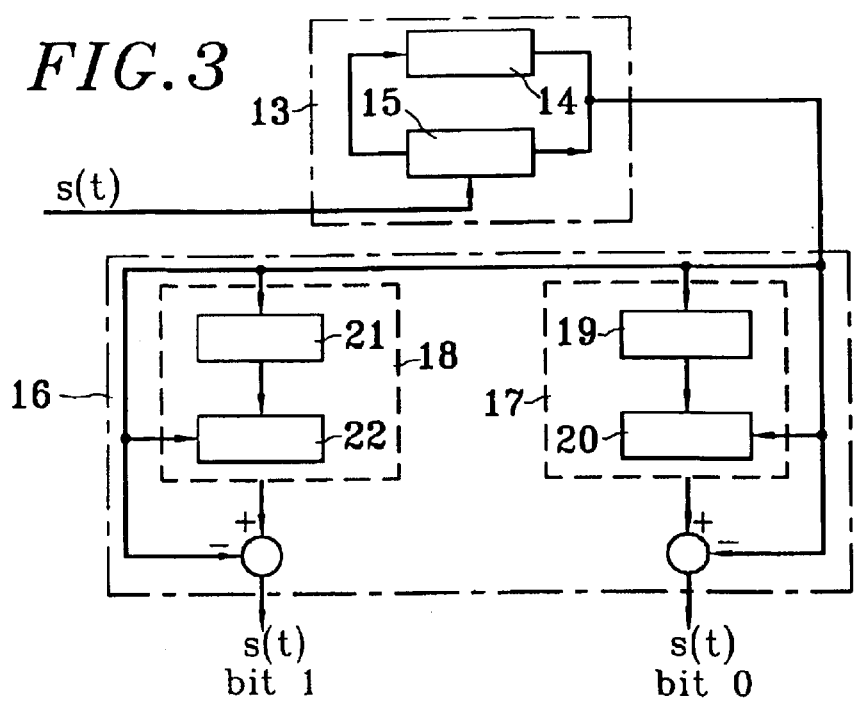
FIG. 3 is a block diagram showing one embodiment of an encryption/decryption system using chaos synchronization proposed for implementing in the optical domain the principles of the systems shown in FIGS. 1 and 2.

The function NL can advantageously be implemented by means of a Mach-Zehnder interferometer 5 integrated on lithium niobate and characterized by a half-wave voltage $V_\pi$, for example. In this case:

$$P_2(t) = P_1 \cos^2\left[\frac{\pi}{2V_\pi} I_{fb}(t-T) + \phi_0\right]$$

where $\phi_0$ is an arbitrary phase-shift related to an offset current $I_0$ which optimizes the operation of the interferometer. For the feedback loop including an interferometer of the above kind to operate as a high dimension chaos generator, the function NL must have several maxima and minima. This is obtained for $$\Delta I_{fb} \gg 2V_\pi$$

where $\Delta I_{fb}$ represents the range of excursion of the signal $I_{fb}(t)$. This range is easily adjusted by means of the gain $\eta_1$ of the element 3. The particular feature of the chaotic sender system shown here lies in the fact that the non-linearity is introduced by means of an interferometer fed optically by an auxiliary source $S_1$ 6 and not by the original source 1, as in the chaos generator shown in FIG. 1. The consequence of this is that the luminous intensity P(t) of the source 1, which is transmitted by optical fibre to the receiver, encodes the message s(t) in the form of chaos governed by equation (3).

The advantage of this is that a receiver of very simple design can then be used to decrypt the message.

b) The receiver includes:

a subsystem that constitutes a replica of the feedback circuit used in the sender, this subsystem including:

a first photodiode 9 (similar to 3) which converts the luminous power P(t) from the transmission channel into an electrical signal I'(t) with a conversion factor $\eta_1$: I'(t)=$\eta_1$P(t);

a delay line 10 that delays I'(t) by a time T;

an interferometer 11 identical to that used in the sender, to which the delayed signal I'(t−T) is applied;

an auxiliary source S' 12 of constant intensity $P_1$ which feeds the interferometer optically to give at its output a power P'$_2$(t)=P'$_1$NL[I'(t−T)];

a second photodiode 13, identical to 7, which converts P'$_2$(t) into a current I"(t); the relation between this current I"(t) and the optical power P(t) is written:

$$I''(t) + \tau \frac{d}{dt} I''(t) = \eta_2 P_1 NL[\eta_1 P(t-T)] \quad (4)$$

in which τ represents the time constant of the subsystem; comparing equations (3) and (4), it is seen that I"(t) reproduces the chaotic fluctuations of $I_m(t)$ without the message s(t) introducing any disturbance.

a subtractor circuit 14 which performs a subtraction operation on the input electrical signal I'(t) from the receiver and the signal I"(t) delivered by the element 13, adjusting the gains at each input of the subtractor to obtain a difference signal proportional to the message s(t).

This receiver circuit is simple to implement and uses standard components. Note that this process does not require any additional synchronization channel between the sender and the receiver.

c) Experimental implementation

The laser diode (1) used was a semiconductor laser with a wavelength of 1 550 nm, nominal power 5 mW and modulated internally by the current s(t)+Im(t) on which was superimposed an offset current $I_{DC}$=20 mA (shown in FIG. 4) in order to operate beyond the threshold current in the linear part of the curve $P_0$=f(I) of the chip. The bandwidth of the laser diode was 10 GHz. The power emitted by one face of the chip was launched into the transmission channel. The photodiode 3 used was that integrated into the device by the manufacturer on the same side as the other facet of the laser chip. This enabled direct use of lasers available off the shelf. This photodiode is generally associated with a transimpedance amplifier, the gain $\eta_1$ of which can be varied. The delay line 4 introduced a delay T=50 ns, greater than the time constant τ=1 ns of the feedback loop.

The interferometer 5 in the feedback loop was a Mach-Zehnder interferometer integrated on lithium niobate with the following specifications: Z cut, half-wave voltage Vπ=3 V at the 1 550 nm wavelength, bandwidth 10 GHz. The gain $\eta_1$ of the photodiode 3 was adjusted so that the control voltage of the interferometer could reach values in the order of $5V_{90}$=15 V. Under the above conditions, the control voltage could scan five periods of the non-linear function NL, which corresponds to chaos for which the bifurcation parameter β is in the order of 10. The dimension of the chaos obtained was d=0.8 βT/π=400, which corresponded to the number of positive or null Lyapunov exponents of order 200.

This process therefore provided a high number of positive or null Lyapunov exponents compared to that (of order 3) generally used for encrypting signals in prior art devices, which contributes to assuring a high degree of confidentiality.

The auxiliary source S 6 illuminating the interferometer was a light-emitting diode emitting a constant luminous power of 250 mW. The photodiode 7, mounted with a transimpedance amplifier of variable gain $\eta_2$, delivered a control voltage with a peak amplitude compatible with the modulator circuit 2 of the laser diode to prevent saturation.

Under the above conditions, the laser diode emitted chaotic fluctuations of average power 2 mW and of mean square error 1 mW. The message s(t) to be encrypted was applied with a level that could be −10 dB below that of the voltage supplied by the element 7.

The receiver was constructed from the same elements as the sender. The gain $\eta_2$ of the photodiode 9 was adjusted so that the control voltage of the interferometer 11 was the same as that of the interferometer 5. Each input of the subtractor 14 was set up with a gain such that the output signal of the subtractor was a null signal when no message s(t) was transmitted.

The send and receive devices that have just been described in the case of optical transmission are easy to transpose to radio transmission.

Figure 6A:
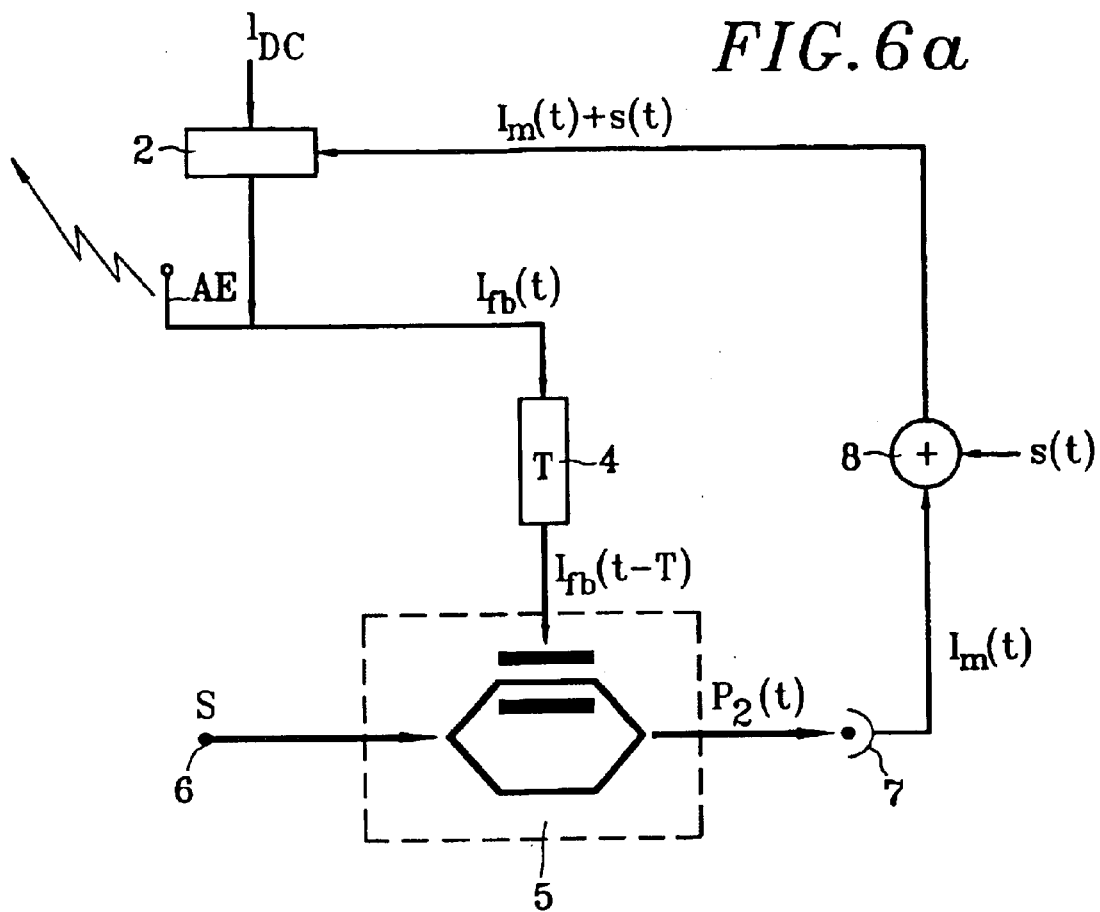
FIGS. 6a and 6b are block diagrams similar to those of FIGS. 4 and 5 which show a sender device and a receiver device constituting one embodiment of the invention in the case of radio frequency transmission.
Figure 6B:
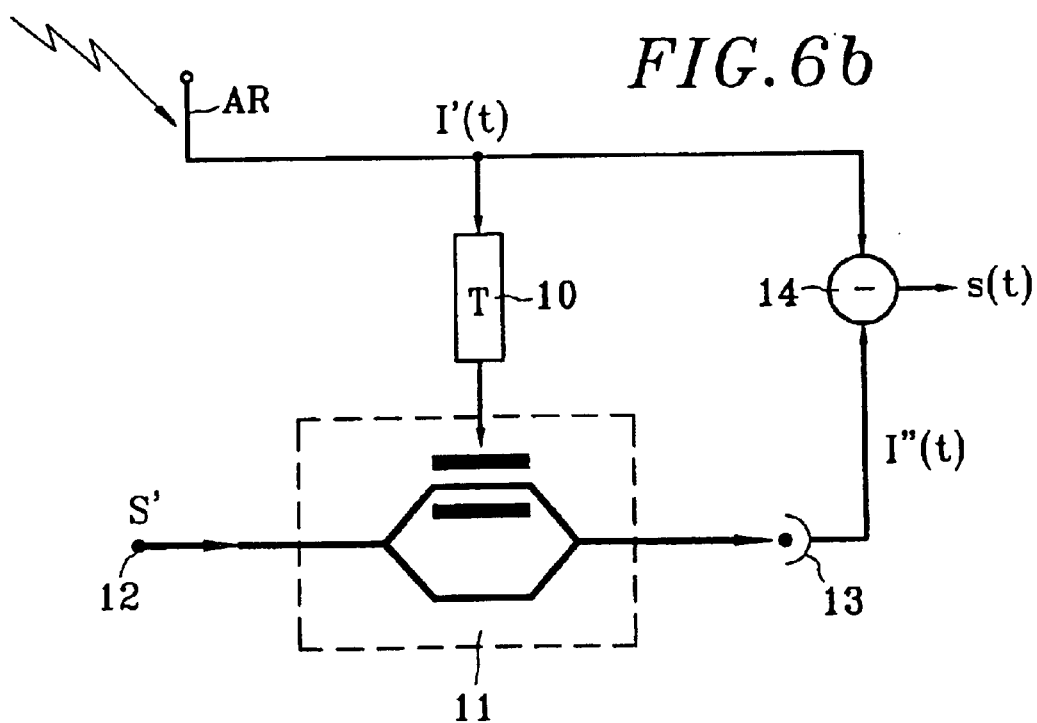

Send and receive devices in this sense are shown in FIGS. 6a and 6b.

The devices are analogous to those described previously with reference to FIGS. 4 and 5, except for the following differences.

In the send device, the laser diode 1 and the photodiode 3 have been eliminated.

The output of the modulator element 2 is connected directly to the input of the delay line 4.

This output, which corresponds to the microwave chaotic signal P(t), is applied to a transmit antenna AE.

In the receive device, the photodiode 9 is replaced by a receive antenna AR.

What is claimed is:

1. Device for sending an encrypted signal, including:
    a source (1) for generating said signal and means (2) for producing chaotic modulation of a luminous intensity of the signal,
    a feedback loop which includes delay line means and non-linear means,
    characterized in that the feedback loop includes:
        an interferometer (5) to which is applied an electric current that corresponds to the delayed generated signal and an auxiliary source of constant intensity that feeds the interferometer optically, the output signal of the interferometer being a non-linear function of the output signal of the delay line means,
    a photodiode (7) which converts the luminous power at the output of the interferometer to a modulation current, and
    a summing circuit (8) which adds the message to be encrypted to the modulation current at the output of said photodiode, the output signal of the summing circuit controlling modulator means.

2. Device according to claim 1, characterized in that the source (1) for generating the signal is an optical source, said device including a photodiode which converts the generated signal into an electrical signal and means for injecting the electrical signal into the input of the delay line means.

3. Device according to claim 2, characterized in that the modulation means are internal to the source emitting the optical signal.

4. Device according to claim 2, characterized in that the modulator means are external to the source emitting the optical signal.

5. Device according to claim 1, characterized in that the source for generating the signal is a radio frequency source.

6. Device for receiving an encrypted signal, including:
    means (9) for receiving said signal;
    a feedback loop which includes delay line means and non-linear means,
    characterized in that the feedback loop includes:
        an interferometer (11) to which is applied a current that corresponds to the delayed received signal and an auxiliary source of constant intensity which feeds the interferometer optically, the interferometer output signal being a non-linear function of the output signal of the delay line means,
    a first photodiode (13) which converts the luminous power at the interferometer output into a current,
    a second photodiode to produce the base chaotic modulation of a luminous intensity of said signal based on the interferometer output, and
    a subtractor circuit (14) which applies the subtraction operation to the received signal and to the output of said second photodiode, the output signal of the subtractor circuit being the demodulated signal.

7. Device according to claim 6, characterized in that the encrypted signal is an optical signal and the receiver means comprise a photodiode (9) that converts the luminous power of the encrypted signal into an electrical signal.

8. Device according to claim 6, characteized in that the encrypted signal is a radio frequency signal and the receiver means include a receive antenna.

9. Device according to any one of the preceding claims, characterized in that the interferometer (5) is of the Mach-Zehnder type.

10. Device according to claim 9, characterized in that the Mach-Zehnder interferometer (5) is integrated on lithium niobate, gallium arsenide or silicon.

* * * * *